(No Model.)
J. C. BALLEW.
MACHINE FOR REMOVING KNOTS FROM POLES.
No. 476,859. Patented June 14, 1892.
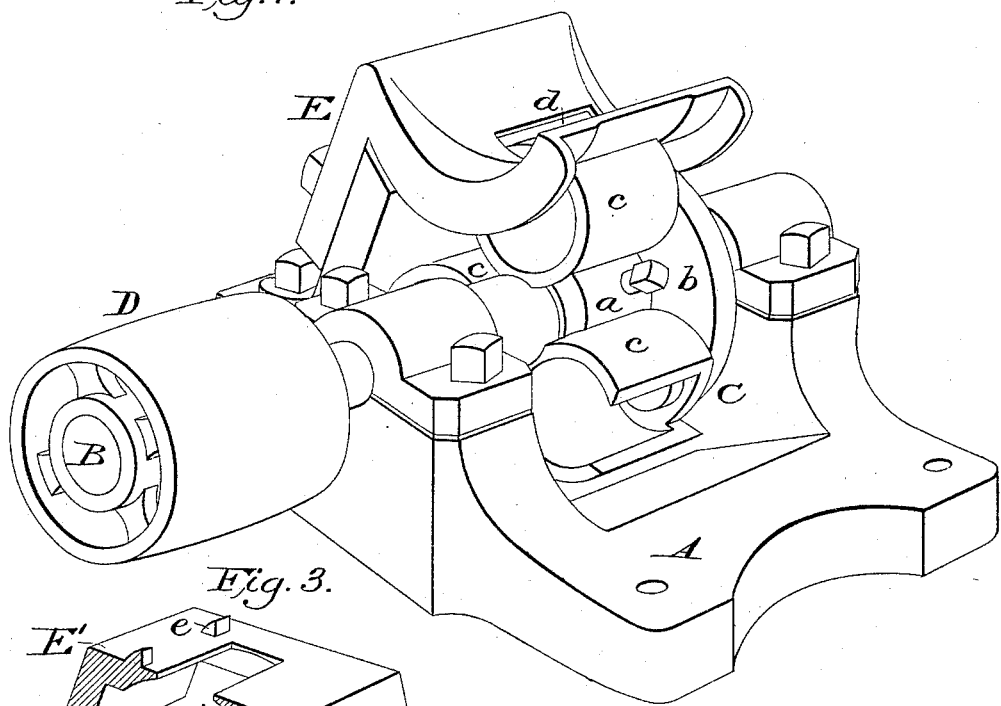
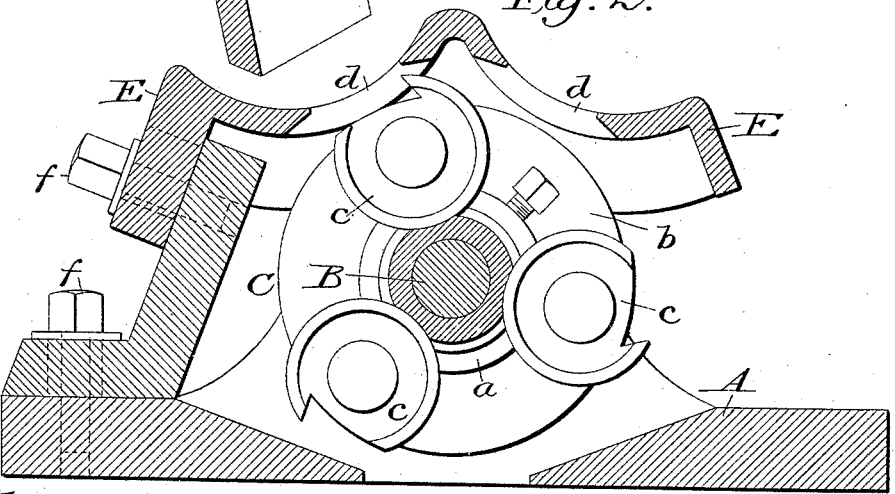
Witness:
James F. Duhamel.
Horace A. Dodge.
JOHN C. BALLEW,
Inventor,
by Dodge Sons
Attorneys.

UNITED STATES PATENT OFFICE.

JOHN C. BALLEW, OF EVANSVILLE, INDIANA.

MACHINE FOR REMOVING KNOTS FROM POLES.

SPECIFICATION forming part of Letters Patent No. 476,859, dated June 14, 1892.

Application filed November 30, 1891. Serial No. 413,498. (No model.)

*To all whom it may concern:*

Be it known that I, JOHN C. BALLEW, a citizen of the United States, residing at Evansville, in the county of Vanderburg and State of Indiana, have invented certain new and useful Improvements in Machines for Removing Knots from Poles, of which the following is a specification.

My invention relates to machinery for removing the knots from poles used in manufacturing barrel-hoops; and it consists in features, details, and combinations hereinafter set forth and claimed.

In the drawings, Figure 1 is a perspective view of my machine in its preferred form; Fig. 2, a vertical transverse sectional view of the same, showing, however, a double in lieu of a single work-support; and Fig. 3, a sectional perspective view of a modified construction of the work-support.

A indicates a main frame, which may be of almost any desired construction, in which is journaled a shaft B, carrying the cutter-head C and the pulley D. The cutter-head comprises a sleeve or collar $a$, a disk $b$, and a series of cutters $c$, which latter are secured to the disk.

E indicates the work-support, which projects upward from the bed or frame A and thence forwardly over the cutter-head C and is provided with a hole or opening $d$ of a length substantially equal to the length of the cutters $c$, which latter work up into the opening, but which under no circumstances should project appreciably above the upper face of the work-support. This work-support is curved from front to rear, as shown, so as to form a seat for the pole while being operated upon and prevent the cutters from throwing or forcing the pole back away from the same. In lieu of this curved work-support I may employ a flat work support or plate E', which, as shown in Fig. 3, is provided with an opening $d'$ and with one or more lugs or projections $e$, which prevent the cutters from forcing the pole away from the same.

If desired, the machine may be provided with two work-supports, as shown in Fig. 2; but I prefer the arrangement illustrated in Fig. 1, as I am enabled to gain access to the cutters for adjustment or other purposes without dismounting any of the parts.

In using this machine the pole is placed in or upon the work-support and the knot allowed to project down through the hole or opening therein, so that as the shaft is rotated the cutters $c$ will cut away or remove the knots or projections without destroying the value of the pole.

The work-support is adjustable with reference to the bed or main frame and is held rigidly in its adjusted positions by means of bolts $f$. (Shown in Fig. 2.)

Having thus described my invention, what I claim is—

1. In a machine for removing knots from hoop-poles, the combination, with a main frame, of a shaft journaled therein and provided with a cutter-head and a work-support located above the cutter-head and provided with a hole or opening, down through which the knots shall project, and with a seat for the pole, extending in the direction of the shaft, the said cutter-head and work-support being so arranged and adjusted one in relation to the other that the cutters or knives of the cutter-head shall not project appreciably above the upper face of the work-support.

2. In a machine for removing knots from hoop-poles, the combination, with a main frame, of a shaft journaled therein and provided with a cutter-head, and a work-support curved from front to rear, located above the cutter-head and provided with a hole or opening, down through which the knots shall project, the said cutter-head and work-support being so arranged and adjusted one in relation to the other that the cutters or knives of the cutter-head shall not project appreciably above the upper face of the work-support.

In witness whereof I hereunto set my hand in the presence of two witnesses.

JOHN C. BALLEW.

Witnesses:
JAMES T. WALKER,
LOUIS J. HERMAN.